US007729991B2

(12) United States Patent
Rodriguez et al.

(10) Patent No.: US 7,729,991 B2
(45) Date of Patent: Jun. 1, 2010

(54) METHOD AND SYSTEM FOR ELECTRONIC VOTER REGISTRATION AND ELECTRONIC VOTING OVER A NETWORK

(75) Inventors: Edward Rodriguez, Columbia, MD (US); Thomas K. Vander Vlis, Pasedena, MD (US); Peter J. Butziger, Columbia, MD (US)

(73) Assignee: Booz-Allen & Hamilton Inc., McLean, VA (US)

( * ) Notice: Subject to any disclaimer, the term of this patent is extended or adjusted under 35 U.S.C. 154(b) by 2880 days.

(21) Appl. No.: 09/811,823

(22) Filed: Mar. 20, 2001

(65) Prior Publication Data

US 2002/0138341 A1 Sep. 26, 2002

(51) Int. Cl.
*G06F 21/00* (2006.01)
*G06F 11/00* (2006.01)
*G07C 13/00* (2006.01)
*G06Q 10/00* (2006.01)
*G06Q 30/00* (2006.01)

(52) U.S. Cl. ................................ 705/50; 705/12; 705/1

(58) Field of Classification Search ................... 705/12, 705/1, 50
See application file for complete search history.

(56) References Cited

U.S. PATENT DOCUMENTS

| | | | |
|---|---|---|---|
| 4,015,106 | A | 3/1977 | De Philipo |
| 4,641,240 | A | 2/1987 | Boram |
| 5,218,528 | A | 6/1993 | Wise et al. |
| 5,278,753 | A | 1/1994 | Graft, III |
| 5,495,532 | A | 2/1996 | Kilian et al. |
| 5,521,980 | A | 5/1996 | Brands |
| 5,583,329 | A | 12/1996 | Davis, III et al. |
| 5,613,001 | A | 3/1997 | Bakhoum et al. |
| 5,682,430 | A | 10/1997 | Kilian et al. |
| 5,748,735 | A | 5/1998 | Ganesan |
| 5,850,443 | A | 12/1998 | Van Oorschot et al. |
| 5,872,846 | A | 2/1999 | Ichikawa |
| 5,878,399 | A | 3/1999 | Peralto |
| 6,081,793 | A | 6/2000 | Challener et al. |

(Continued)

OTHER PUBLICATIONS

Election Verification, VoteHere.net (visited Dec. 21, 2000), pp. 1-2, <http://www.votehere.net/>.

(Continued)

*Primary Examiner*—Andrew J. Fischer
*Assistant Examiner*—Nancy T Le
(74) *Attorney, Agent, or Firm*—Buchanan Ingersoll & Rooney PC

(57) ABSTRACT

A method and system are described for completing and submitting an electronic voter registration form and an electronic ballot over a network. In accordance with exemplary embodiments of the present invention, a blank registration form is transmitted, upon request at a first computer, via a transaction mediator, to the first computer. Registration information is transmitted from the first computer, via a transaction mediator, to a computer database that resides on a transaction repository server, all of which are networked together, to establish a registered voter. Upon request by a registered voter at a second computer, a blank electronic ballot is transmitted from the computer database that resides on the transaction repository server, via a transaction mediator, to the second computer. A voted electronic ballot is transmitted from the second computer, via the transaction mediator, to the computer database that resides on the transaction repository server.

47 Claims, 9 Drawing Sheets

U.S. PATENT DOCUMENTS

| | | | | |
|---|---|---|---|---|
| 6,092,051 | A | 7/2000 | Kilian et al. | |
| 6,111,952 | A | 8/2000 | Patarin | |
| 6,128,391 | A | 10/2000 | Denno et al. | |
| 6,160,891 | A | 12/2000 | Al-Salqan | |
| 6,161,181 | A | 12/2000 | Haynes, III et al. | |
| 6,250,548 | B1 * | 6/2001 | McClure et al. | 235/51 |
| 6,311,190 | B1 * | 10/2001 | Bayer et al. | 707/104 |
| 2002/0077885 | A1 * | 6/2002 | Karro et al. | 705/12 |
| 2002/0077887 | A1 * | 6/2002 | London Shrader et al. | 705/12 |
| 2003/0154124 | A1 * | 8/2003 | Neff | 705/12 |
| 2003/0208395 | A1 * | 11/2003 | McClure et al. | 705/12 |

OTHER PUBLICATIONS

Frequently Asked Questions, VoteHere.net (visited Dec. 21, 2000), pp. 1-8, <http://www.votehere.net/>.

C. Andrew Neff, Recounting an Electronic Election—What Does it Mean?, Nov. 2000, VoteHere.net (visited Dec. 21, 2000), <http://www.votehere.net/>, 4 pages.

C. Andrew Neff, Conducting a Universally Verifiable Electronic Election Using Homomorphic Encryption, Nov. 2000, VoteHere.net (visited Dec. 21, 2000), <http://www.votehere.net/>, 4 pages.

James M. Adler, Wei Dai, Richard L. Green and C. Andrew Neff, Computational Details of the VoteHere Homomorphic Election System, VoteHere.net (visited Dec. 21, 2000), <http://www.votehere.net/>, pp. 1-18.

C. Andrew Neff, Example Homomorphic Election, Mar. 10, 2000, VoteHere.net (visited Dec. 21, 2000), <http://www.votehere.net/>, pp. 1-12.

Jim Adler, Internet Voting Primer, VoteHere.net (visited Dec. 21, 2000), <http://www.votehere.net/>, pp. 1-4.

Jim Adler, Internet Voting Security, Jan. 2000, VoteHere.net (visited Dec. 21, 2000), <http://www.votehere.net/>. pp. 1-4.

Presentation by Ed Gerck, Safevote Internet Decison Making, pp. 1-22, Safevote Inc., 2000.

Technical Information Release by Safevote, Safevote.com (visited Dec. 21, 2000), pp. 1-21, <http://www.safevote.com/>.

California Secretary of State Bill Jones California Internet Voting Task Force, A Report on the Feasibility of Internet Voting, Jan. 2000 (visited Dec. 22, 2000), pp. 1-30, <http://www.ss.ca.gov/executive/ivote/final_report.htm/>.

* cited by examiner

METHOD AND SYSTEM FOR ELECTRONIC VOTER REGISTRATION AND ELECTRONIC VOTING OVER A NETWORK

STATEMENT REGARDING FEDERALLY-SPONSORED RESEARCH OR DEVELOPMENT

This invention was made with Government support under contract No. MDA904-96-C-1553 awarded by the National Security Agency. The Government has certain rights in this invention.

BACKGROUND INFORMATION

1. Field of the Invention

The present invention relates to voting systems. More particularly, the present invention relates to voting systems in which voter registration and voting are conducted electronically over a network.

2. Description of the Related Art

Traditionally, elections are conducted utilizing paper ballots that are issued to registered voters at particular polling places. Before being allowed to vote, individuals must register to vote with their local voter registration offices. This is usually accomplished by either completing the necessary forms at the office itself or by requesting the forms and sending the completed paperwork to the office through the mail. Voting requires the physical attendance of the voter at a particular polling place to allow voting, or requires a mailing of an absentee ballot.

There is tremendous expense associated with conducting elections in a manner that renders the election results substantially free from corruption and error. However, there is no guarantee that traditional voting systems will render error-free election results. In recent years, a renewed interest has been sparked to develop voting systems that are more reliable and accurate.

Electronic communication networks can reduce the inconvenience and expense of traditional voting systems. However, concerns about security and privacy have precluded electronic communication networks from being used for voting.

To address the security issues associated with voting over an electronic communication network, U.S. Pat. No. 6,081,793 (Challener et al.) (the '793 patent), the disclosure of which is hereby incorporated by reference in its entirety, discloses a method and system for secure computer moderated voting that uses a plurality of cryptographic functions to ensure the security of the votes and the privacy of the voters. According to the '793 patent, voters register in a conventional manner and receive authorization to vote in a single election.

It would be desirable to provide an electronic voting system that allows voters to register and vote over a network with minimal security risks.

SUMMARY OF THE INVENTION

A method and system are described for completing and submitting an electronic voter registration form and an electronic ballot over a network. In accordance with exemplary embodiments of the present invention, a blank registration form is transmitted, upon request at a first computer, via a transaction mediator, to the first computer. Registration information is transmitted from the first computer, via a transaction mediator, to a computer database that resides on a transaction repository server, all of which are networked together, to establish a registered voter. Upon request by a registered voter at a second computer, a blank electronic ballot is transmitted from the computer database that resides on the transaction repository server, via a transaction mediator, to the second computer. A voted electronic ballot is transmitted from the second computer, via the transaction mediator, to the computer database that resides on the transaction repository server.

In addition, a method and system are described for verifying at least one of a voter registration status and an electronic ballot status in a voting system. In accordance with an exemplary embodiment of the present invention, at least one computer database is established on a transaction repository server that contains information associated with the at least one of the voter registration status of a citizen and the electronic ballot status. A status is requested at a first computer from the transaction repository server. A status message is determined in response to the status request by examining the at least one computer database. The status message is transmitted from the transaction repository to the first computer.

In an alternate exemplary embodiment of the present invention, registration information is transmitted from the first computer to the computer database that resides on the transaction repository server, all of which are networked together, to establish a registered voter. The voted electronic ballot is transmitted from the second computer to the computer database that resides on the transaction repository server.

In an alternate exemplary embodiment of the present invention, upon request at a first computer, a blank electronic registration form is transmitted to the first computer. Registration information is transmitted from the first computer to a computer database that resides on a transaction repository server, all of which are networked together, to establish a registered voter.

In accordance with alternate exemplary embodiments of the present invention, each citizen generates, or has generated for them, a public-private key pair, which can be generated using an asymmetric cryptographic function, and has created for and issued to them a cryptographic identification. Both the public-private key pair and the cryptographic identification can be used by the citizen with respect to a plurality of electronic transactions.

In an alternate exemplary embodiment of the present invention, a system for completing and submitting an electronic voter registration form and an electronic ballot over a network includes a transaction repository server for transmitting a blank electronic ballot to a first computer. Alternate exemplary embodiments of the system of the present invention can also include a computer database, accessible by the transaction repository server, for storing the blank electronic ballot. Alternate exemplary embodiments of the system of the present invention can also include a transaction mediator for communicating information between the transaction repository server and the first computer, the transaction mediator being operative to transmit registration information from the first computer to the computer database to establish a registered voter, and operative to transmit the voted electronic ballot from the first computer to the computer database.

To ease integration and acceptance by the voting public of an electronic voting system, the electronic voting system of the present invention emulates as closely as possible those features of the traditional voting systems with which voters are accustomed, but provides those features with greater convenience, accuracy, security, and reliability. Exemplary embodiments of the present invention emulate the paper ballot voting process by providing an integrated means by which a voter can both register to vote and cast a ballot, but allow both of these and other steps in the voting process to be conducted through a generic personal computer. Exemplary embodiments of the present invention allow voters to participate in elections from their home, office, or, if they choose, established polling places, without having to travel to varied and numerous locations to complete each step in the voting process.

BRIEF DESCRIPTION OF THE DRAWING FIGURES

Other objects and advantages of the present invention will become apparent to those skilled in the art upon reading the following detailed description of preferred embodiments, in conjunction with the accompanying drawings, wherein like reference numerals have been used to designate like elements, and wherein.

DETAILED DESCRIPTION OF THE PREFERRED EMBODIMENTS

Figure 1:
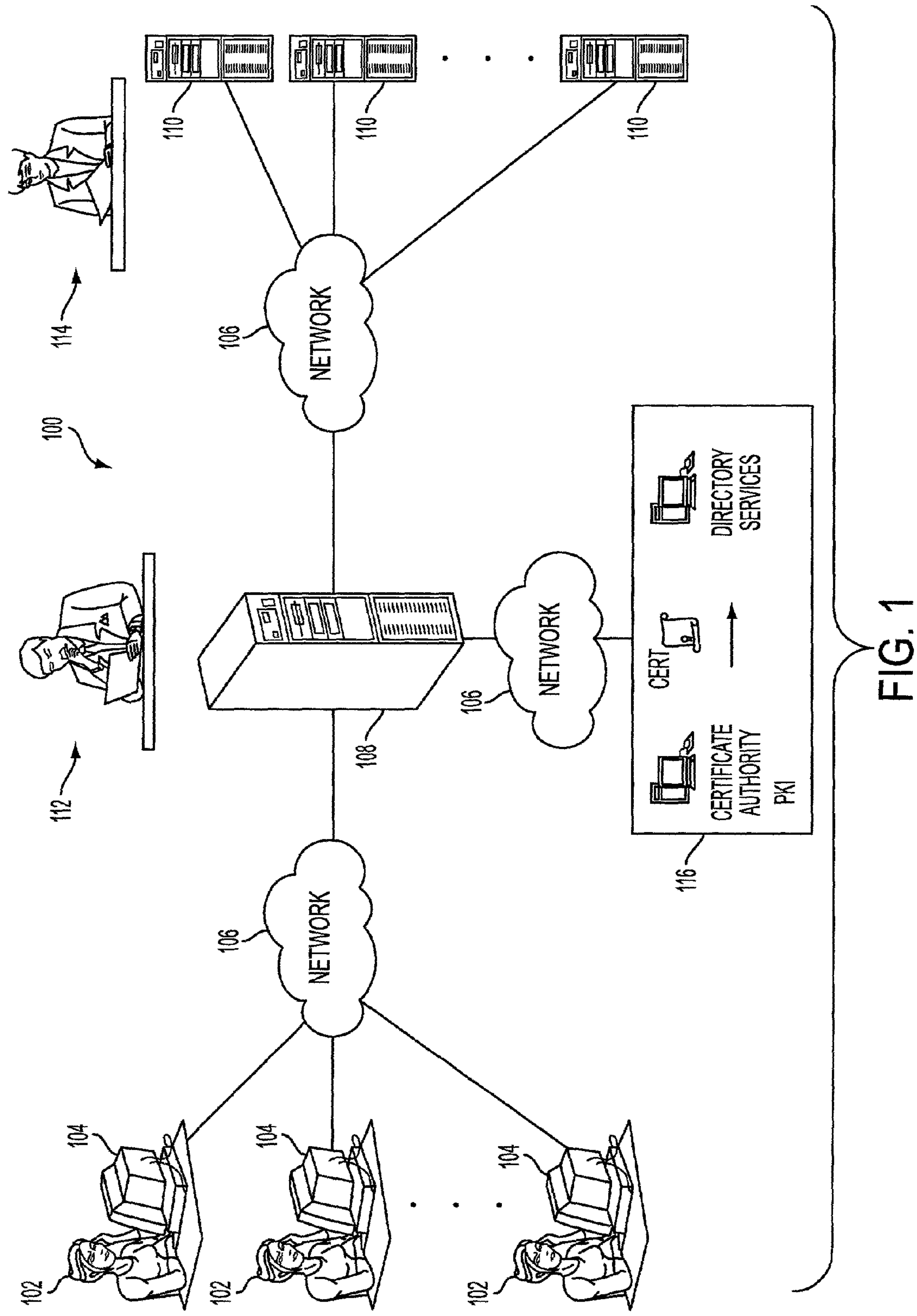
FIG. 1 is a pictorial representation illustrating a system in accordance with an exemplary embodiment of the present invention.

FIG. 1 is a pictorial representation of a system 100 for completing and submitting an electronic voter registration form and an electronic ballot transmitted over a network in accordance with an exemplary embodiment of the present invention. According to an exemplary embodiment of the present invention, system 100 can include a plurality of citizen workstations 104, a plurality of Transaction Repository (TR) servers 110, and one or more Transaction Mediator (TM) servers 108 that are all networked together over an electronic communications network 106, such as, for example, the Internet.

Figure 2:
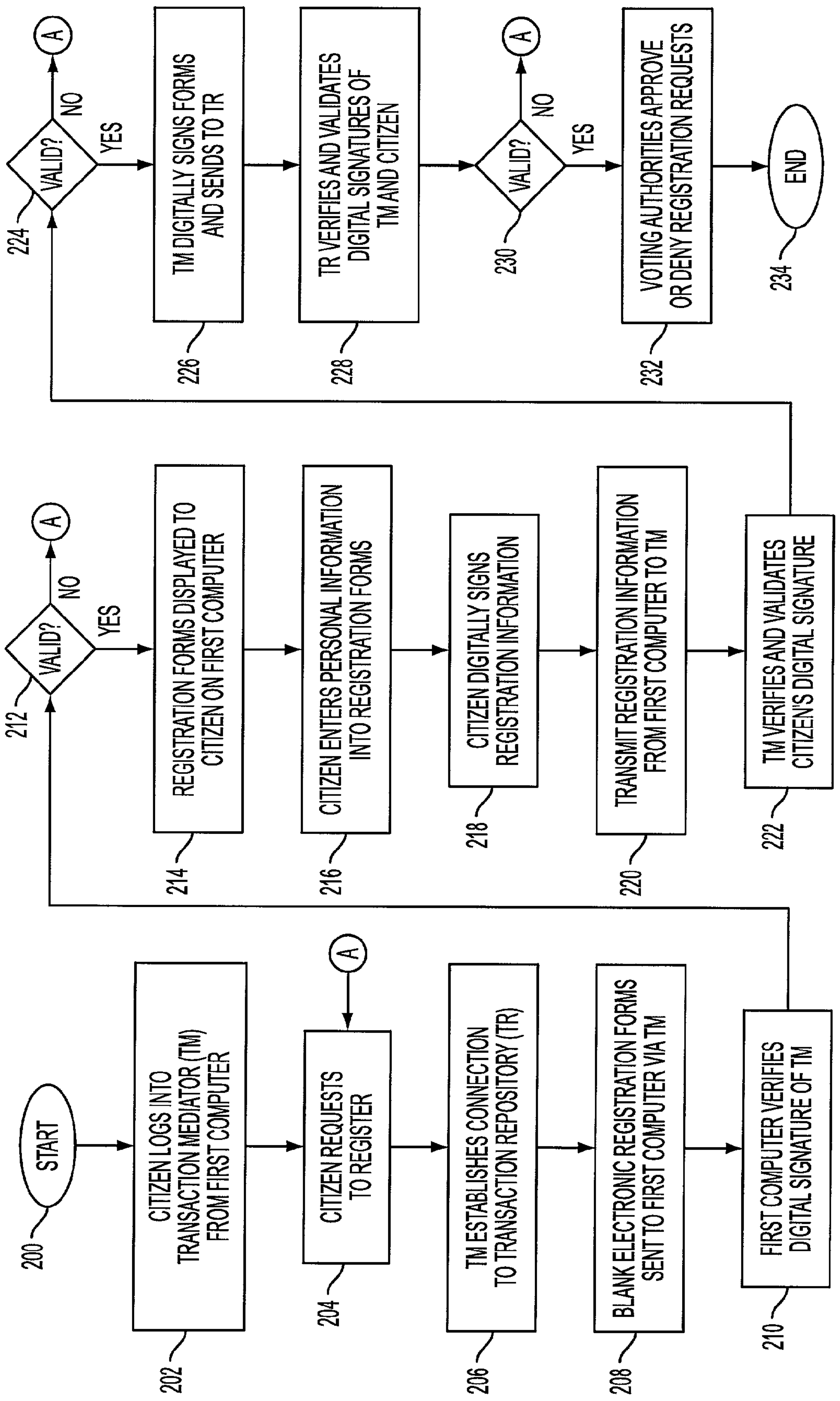
FIG. 2 is a flowchart illustrating the steps carried out for a voter registration request and submission in accordance with an exemplary embodiment of the present invention.

Before a citizen 102 can vote, citizen 102 registers to vote in an upcoming election. An exemplary method for voter registration request and submission will now be described with reference to FIG. 2. In step 202, citizen 102 logs into the system of the present invention. System login can be performed using any method. According to an exemplary embodiment of the present invention, system 100 login can be performed using a one-time login based on a random challenge response method using a cryptographic identification. To login, citizen 102 accesses a TM server 108 by entering the network address of a TM server 108 into a first computer, for example, by entering the network address into a browser, for example, a web browser, running on the first computer. In an exemplary embodiment of the present invention, the first computer can be a citizen workstation 104. The first computer (e.g., citizen workstation 104) can use, for example, any web browser, such as Netscape Communicator, that supports encrypted sessions, or any other encryption protocol.

Once citizen 102 accesses TM server 108, an encrypted session is initiated. The network of system 100 supports an encrypted communication channel between at least one of the first computer (e.g., citizen workstation 104) and a second computer (e.g., the same or different citizen workstation 104) and a transaction mediator (e.g., TM server 108), and an encrypted communication channel between the transaction mediator (e.g., TM server 108) and a transaction repository server (e.g., TR server 110). The encrypted communication channels provide security for the information that is transmitted between the computer systems which comprise the system of the present invention. The communication channels can be encrypted using any known transmission encryption protocol, such as, for example, a secure sockets layer (SSL), or, more specifically, SSL3 with client authentication, or any other encryption protocol. SSL works by using a secret key to encrypt data that is transferred over the SSL connection.

Prior to registering to vote, each citizen 102 generates, or has generated for them, a public-private key pair using an asymmetric cryptographic function. Also prior to registering to vote, each citizen 102 has created for and issued to them a unique cryptographic identification. According to an exemplary embodiment of the present invention, the cryptographic identification of citizen 102 can be an X.509 digital certificate, or any other cryptographic identification. A digital certificate includes, for example, the public key of the generated public-private key pair and personal information of citizen 102. The personal information of citizen 102 can include, for example, the name, address, voter registration number, and any other desired information that can be used either alone or in combination with other information to uniquely identify citizen 102. The cryptographic identification can be issued to citizen 102 on, for example, a floppy disk, "smart card," or any other electronic storage media. The cryptographic identification can also be issued to citizen 102 over a network, and subsequently stored on, for example, a floppy disk, "smart card," or any other electronic storage media.

When required by the system of the present invention, citizen 102 is prompted for the private key that was previously generated by or for citizen 102 and for the cryptographic identification that was previously created for and issued to citizen 102. Citizen 102 enters the information by, for example, inserting the floppy disk or smart card containing the private key and cryptographic identification into the first computer or second computer (e.g., citizen workstation 104) and providing a personal identification number (PIN) or password. The first computer or second computer (e.g., citizen workstation 104) can then retrieve the information, for example, from the floppy disk or smart card. According to an exemplary embodiment of the present invention, the PIN or password can be replaced, or accompanied, by the use of a biometric authentication mechanism.

The public-private key pair is generated by or for each citizen 102 using an asymmetric cryptographic function. Asymmetric cryptography, also referred to as public-key cryptography, uses two keys—one key is private and the other key is public. A message encrypted with one key is decrypted with the other key. The public key can be used to encrypt information that can only be decrypted by someone possessing the private key. Generally, however, the private key is used to digitally sign a document. Once signed, the public key contained as part of the cryptographic identification can be used in verifying the identity of citizen 102.

In accordance with exemplary embodiments, the process of digitally signing a document involves running a document or other electronic information object through a hash function. A hash function generates a unique hash number such that if any bit or bits of the document are changed, a different hash number is generated if run through the same hash function again. The hash number is encrypted using the private key of citizen 102 resulting in a digital signature. The digital signature and the digital certificate are attached to the document and transmitted.

In accordance with exemplary embodiments, the process of verifying a digital signature involves the recipient running the document through an identical hash function to generate a hash number. The digital signature attached to the document is decrypted using the public key contained in the digital certificate. If the decrypted hash number and the hash number generated by the recipient match, then the recipient can be assured that the document was transmitted without modification.

The cryptographic identification can be created for and issued to citizen 102 by a trusted third party, for example, the United States Post Office or some other Certification Authority (CA). A CA is a trusted third-party organization or company that issues digital certificates used in the creation and verification of digital signatures. The role of the CA in the process is to guarantee that the individual granted the unique certificate is, in fact, who he or she claims to be. When CAs are involved in the process of verifying and authenticating the validity of digital signatures, the system is referred to as a public key infrastructure (PKI). A good discussion of public keys, private keys, digital signatures, and public-key cryptography in general can be found at "Applied Cryptography," by Bruce Schneier, published by John Wiley & Sons, Inc., more precisely identified by International Standard Book Number ISBN 0-471-59756-2, the disclosure of which is hereby incorporated by reference.

According to an exemplary embodiment of the present invention, the public-private key pair generated by or for citizen 102 and the cryptographic identification created for and issued to citizen 102 are generic in nature, meaning that the public-private key pair and cryptographic identification are not vote-specific. In other words, the public-private key pair and the cryptographic identification can be used by the citizen with respect to multiple electronic transactions. For instance, citizen 102 can use the public-private key pair and the cryptographic identification to register to vote and/or vote in different elections. In addition to voting, citizen 102 can use the public-private key pair and the cryptographic identification for engaging in electronic commerce. Thus, citizen 102 can use the public-private key pair and cryptographic identification for any electronic transaction that requires the use of a secure means by which to identify a particular user. Consequently, citizen 102 does not need additional public-private key pairs generated and cryptographic identifications created and issued each time citizen 102 wishes to vote or engage in other electronic transactions. Rather, citizen 102 can use the same public-private key pair and cryptographic identification to vote in any election or engage in any other electronic transaction.

Once citizen 102 is logged into TM server 108, citizen 102 is provided with election service options, for example, via a web page interface within the web browser running on the first computer (e.g., citizen workstation 104). Through the election service options on the first computer, citizen 102 can request to register to vote in step 204. The request to register can include, for example, the state and county of the citizen's residence. Based upon the voting registration request, in step 206 TM server 108 establishes a connection to the TR server 110 that is assigned to process the registration and voting information associated with the district or area in which citizen 102 resides. In step 208, upon request at a first computer, a blank electronic registration form is transmitted, via a transaction mediator, to the first computer. In an exemplary embodiment of the present invention, the first computer can be one of the citizen workstations 104 and the transaction mediator can be one of the TM servers 108.

The network of system 100 includes one or more transaction mediators. In an exemplary embodiment of the present invention, the transaction mediator can be TM server 108. In accordance with an exemplary embodiment, TM server 108 is networked with the first computer (e.g., citizen workstation 104) and TR server 110. TM server 108, for example, authenticates identities using cryptographic information transmitted between the first computer (e.g., citizen workstation 104) and TR server 110. TM server 108 verifies digital signatures and validates the cryptographic identification of citizen 102 in accordance with, for example, X.509 standards. TM server 108 performs the validation using the transmitted cryptographic information and additional information obtained from CA 116 to confirm the identity of the owner of the digital certificate and to confirm that the digital certificate is currently valid. TM Server 108 also has generated by or for it a public-private key pair and created and issued to it a unique cryptographic identification, such as a digital certificate.

In an exemplary embodiment of the present invention, TM server 108 can also maintain a database of blank electronic registration forms. Alternatively, the database of blank electronic registration forms can be maintained by a TR server 110. In addition, TM server 108 can perform event logging and reporting. Along with the voting registration forms, other information that is to be displayed, filled out, or submitted with a voting registration form, such as instructions, state oaths, and affirmations, can be maintained in the database along with the voting registration forms. The electronic registration forms and accompanying information are created using, for example, a software program that generates HyperText Markup Language (HTML) files so that the information can be displayed to citizen 102 within the web browser running on the first computer (e.g., citizen workstation 104). Once created, the forms and information can be digitally signed with the private key of TM server 108. The digital certificate of TM server 108 can be attached to the digitally signed forms. In addition, an identification tag of the TR server 108 which will process the forms can also be attached to the forms. The TR identification tag can be, for example, an IP address of the corresponding TR server 108. The digitally signed and tagged forms can be stored within the database residing in, for example, TM server 108, or in any other desired database.

In step 208, TM server 108 transmits the blank electronic registration form to the first computer (e.g., citizen workstation 104). Upon receipt of the blank electronic registration form, the first computer (e.g., citizen workstation 104) verifies the digital signature of TM server 108 in step 210. If successfully verified in step 212, in step 214 the electronic registration form (and any accompanying information) is displayed to citizen 102 within the web browser running on the first computer (e.g., citizen workstation 104). In step 216, citizen 102 enters registration information into the electronic registration form by, for example, either typing in information using a keyboard or making selections using a computer pointing device, such as, for example, a computer mouse, or in any manner in which an individual can enter information into a computer. If the digital signature of TM server 108 is not successfully verified in step 212, citizen 102 must make another request to register in step 204. In step 218, citizen 102 digitally signs the registration information using the private key of the public-private key pair generated by or for citizen 102.

To become a registered voter, in step 220 citizen 102 transmits registration information from the first computer (e.g., citizen workstation 104), via the transaction mediator (e.g., TM server 108), to a computer database that resides on a transaction repository server (e.g., TR server 110), all of which are networked together, to establish a registered voter. The registration information includes at least one descriptive element associated with a citizen. Such descriptive elements can include, for example, at least one of a name, mailing address, voting address, age, social security number, race, occupation, and any other information that is desired to uniquely describe and identify a citizen. In accordance with exemplary embodiments of the present invention, the registration information can include not only the descriptive elements, but also the electronic registration forms as well. Thus, the information that is transmitted from the first computer (e.g., citizen workstation 104) can include either the descriptive elements entered by citizen 102 alone, or both the descriptive elements and the electronic registration form combined.

Once citizen 102 has completed entering registration information into the electronic registration form in step 216, citizen 102 submits the registration information for transmission to the appropriate TR server 110 in step 220. Submission of the registration information can also require citizen 102 to affirm the entered information in whole or in part and adhere to any required state oath. The affirmation and oath can be submitted to the designated TR server 110 along with the completed registration information. Once the registration information and any accompanying forms are completed and digitally signed, the identification tag of the appropriate TR server is attached to the information. In step 218, the registration information and identification tag can be digitally signed by citizen 102 using the private key generated by or for citizen 102. The cryptographic identification created for and issued to citizen 102 can also be attached to the digitally signed registration information and identification tag in step 218 and transmitted to TM server 108 in step 220. If confidentiality of the registration information is necessary, the registration information can be encrypted prior to digitally signing using any known encryption technique or combination of encryption techniques, such as, for example, symmetric or asymmetric cryptography. Once the registration information is transmitted, information associated with the registration information, including, for example, all forms and descriptive elements, can be erased from the first computer (e.g., citizen workstation 104).

In step 222, TM server 108 can verify the digital signature of the registration information using the public key of the public-private key pair generated by or for citizen 102 and contained within the cryptographic identification of citizen 102. TM server 108 can verify the digital signature of citizen 102 and validate the cryptographic identification of citizen 102 in accordance with, for example, X.509 standards. If successful in step 224, in step 226 TM server 108 can attach a date-time stamp and digitally sign the validated registration information using the private key generated by or for TM server 108. TM server 108 can also attach the cryptographic identification created for and issued to TM server 108. Also in step 226, TM server 108 then forwards the validated registration information to the TR server 110 indicated by the TR server identification attached to the validated registration information. If unsuccessful in step 224, citizen 102 must make another request to register in step 204. Once the registration information is transmitted, information associated with the registration information, including, for example, all forms and descriptive elements, can be erased from TM server 108.

Upon receipt of the validated registration information at the designated TR server 110 in step 228, TR server 110 can use the public keys of TM server 108 and citizen 102 to verify the digital signatures of both TM server 108 and citizen 102. If successfully verified in step 230, TR server 110 can, for example, send a confirmation response to TM server 108. The confirmation response received by TM server 108 can cause TM server 108 to provide an additional confirmation response to the first computer (e.g., citizen workstation 104). If not successfully verified in step 234, citizen 102 must make another request to register in step 204. In an alternate exemplary embodiment, if not successfully verified in step 234, TR server 110 can, for example, send a failure response to TM server 108. The failure response received by TM server 108 can cause TM server 108 to provide a similar failure response to the first computer (e.g., citizen workstation 104).

Voter registration requests are processed by TR administrative personnel 114 in step 232 by approving or denying a voting registration request at the computer database based on the registration information of a citizen. According to an exemplary embodiment of the present invention, TR server 110 can store all received electronic registration forms in the computer database residing on TR server 110. Initially, all requests can be stored, for example, in a pending table within the computer database. The registration information associated with approved requests is stored in the computer database, for example, in a table of approved requests. The registration information associated with denied requests are stored in the computer database in, for example, a table of denied requests. TR personnel 114 can view the registration information of any citizen at any time, but cannot change registration information. Once voting registration is approved, citizen 102 becomes a registered voter.

Figure 3A:
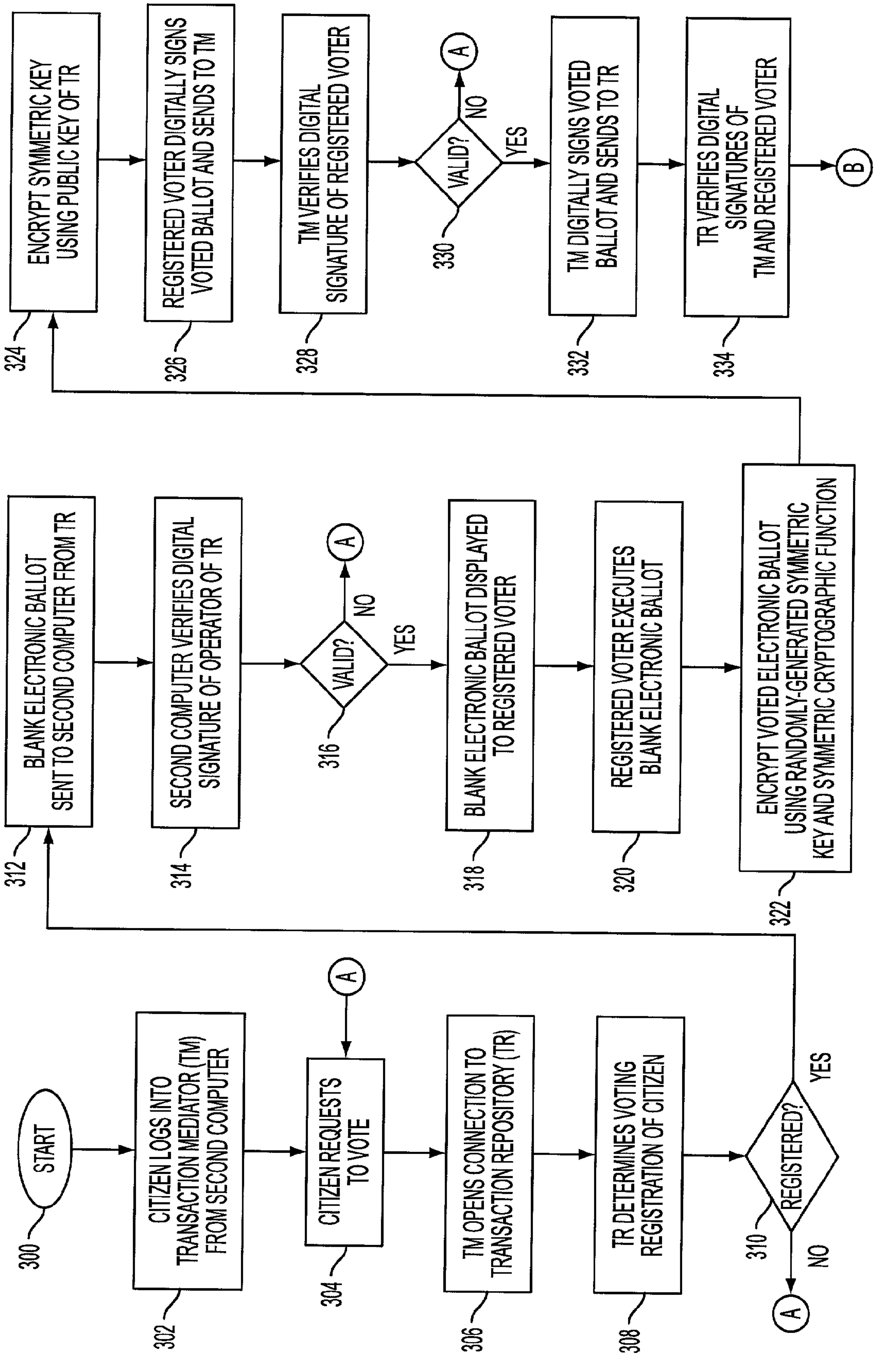
FIGS. 3A and 3B are flowcharts illustrating the steps carried out for a ballot request and voting in accordance with an exemplary embodiment of the present invention.
Figure 3B:
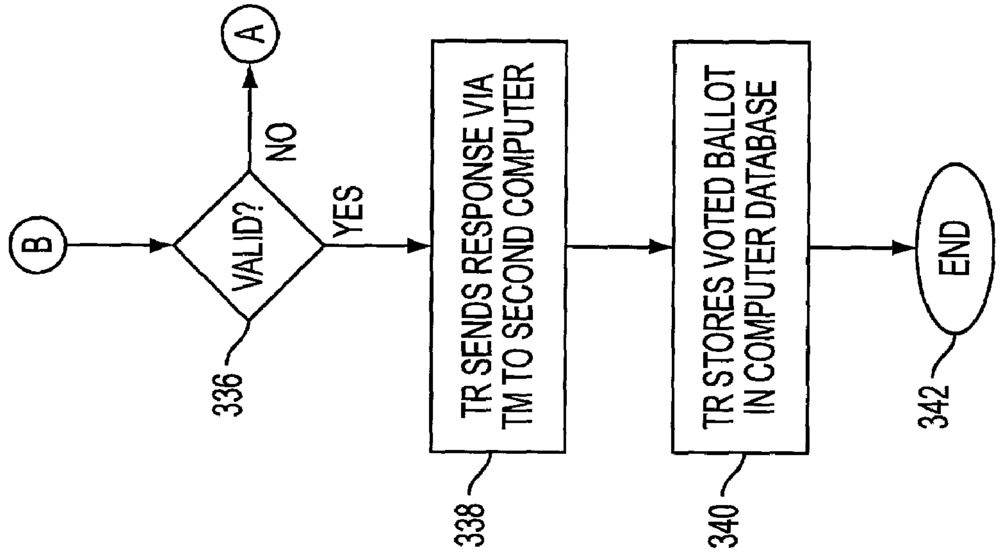

Once a citizen 102 becomes a registered voter, citizen 102 can vote in at least one future election. An exemplary method for ballot request and voting for a single election will now be described with reference to FIGS. 3A and 3B. In step 302 of FIG. 3A, citizen 102 begins by logging into TM server 108, if not already, in the manner described previously. After successful login, citizen 102 is presented with election service options through which citizen 102 requests to vote in step 304. As part of the request, citizen 102 can include, for example, the state and county of the citizen's residence. As a result of the request to vote, in step 306 TM server 108 establishes a connection to the appropriate TR server 110 and forwards the voting request to that appropriate TR server 110.

Upon request by the registered voter at a second computer, in step 312 a blank electronic ballot is transmitted from the computer database that resides on the transaction repository server (e.g., TR server 110), via the transaction mediator (e.g., TM server 108), to the second computer. Since voter registration and voting can be performed on the same or different citizen workstations 104, the second computer used by the registered voter can be the first computer (e.g., the same citizen workstation 104 that citizen 102 used to register) or a different citizen workstation 104 that citizen 102 uses to vote electronically. The transaction repository server (e.g., TR server 110) also has generated by it or for it a public-private key pair and created for it and issued to it a unique cryptographic identification, such as a digital certificate.

After receiving the request to vote, in step 308 TR server 110 determines if citizen 102 is registered to vote. TR server 110 can make this determination by, for example, retrieving registration information for citizen 102 from the approved table stored in the computer database that resides in TR server 110. If TR server 110 determines in step 310 that citizen 102 is eligible to vote, then TR server 110 transmits a blank electronic ballot to the second computer in step 314. If it is determined that citizen 102 is ineligible to vote in step 210, citizen 102 must make another request to vote in step 304. In an exemplary embodiment of the present invention, to send the blank electronic ballot, TR server 110 can transmit the blank electronic ballot, for example, via TM server 108. TM server 108 can, for example, relay the blank electronic ballot to the second computer (e.g., citizen workstation 104) into which citizen 102 is logged.

Voted electronic ballots are created by, for example, TR personnel 114 and stored in the computer database residing on the transaction repository server (e.g., TR server 110). Ballots can be created using any conventional tool, for example, that supports the creation of HMTL files. Each type or style of blank electronic ballot can have a state oath and/or affirmation statement accompany the ballot, depending on the federal, state, and local election requirements. Each blank electronic ballot can have included with it the cryptographic identification (e.g., digital certificate) created for and issued to, or the public key of the public-private key pair generated by or for, the transaction repository server (e.g., TR server 110). In addition, the blank electronic ballot can have included with it the ballot type, an identification tag of the appropriate TR server 110, and a return network address for the voted electronic ballot. These pieces of information can be used to create a blank electronic ballot object that is digitally signed with the private key generated by or for the operator of the transaction repository server, e.g., TR personnel 114. The cryptographic identification created for and issued to the transaction repository server can be attached to the digitally-signed ballot object and the entire object stored in the computer database which resides on the transaction repository server (e.g., TR server 108).

After receiving the blank electronic ballot, in step 314 the second computer (e.g., citizen workstation 104) can verify the digital signature of TR server 110. If successfully verified in step 316, in step 318 the second computer (e.g., citizen workstation 104) displays the blank electronic ballot to citizen 102, for example, in the web browser running on the second computer (e.g., citizen workstation 104). If not successfully verified in step 318, the registered voter must make another request to vote in step 304. In step 320, the registered voter executes the blank electronic ballot. In executing the ballot, the registered voter, for example, makes selections within the ballot, answers questions, and supplies whatever information is necessary to vote the electronic ballot. Citizen 102 can make selections by, for example, using a keyboard or by using a computer pointing device, such as, for example, a computer mouse, or in any manner in which an individual can enter information into a computer.

Once the registered voter has voted, the voted electronic ballot is transmitted from the second computer, via the transaction mediator, to the computer database that resides on the transaction repository server. In accordance with an exemplary embodiment of the present invention, the voted electronic ballot is transmitted from the second computer (e.g., citizen workstation 104) to the computer database residing on TR server 110, via TM server 108. According to an exemplary embodiment of the present invention, the voted electronic ballot can include, for example, both the ballot form and the selections of the voter. Alternatively, the information which is transmitted to the computer database can include the selections of the voter alone. In an alternate exemplary embodiment of the present invention, the registered voter can, for example, print out the voted electronic ballot at the second computer (e.g., citizen workstation 104) and submit the ballot through regular mail instead of proceeding with electronic voting.

Once the electronic ballot is voted, in step 322 the voted electronic ballot is encrypted, for example, using a symmetric cryptographic function and a symmetric key that is randomly generated by the second computer (e.g., citizen workstation 104). Any symmetric cryptographic function, such as, for example, Triple Data Encryption Standard (DES), may be used to encrypt the voted electronic ballot.

Symmetric key cryptography is an encryption system where the same key is used both to encrypt and to decrypt information. Thus, if a sender and receiver of a message want to communicate, they must share a single, common key that is used to encrypt and decrypt the message. Symmetric key systems are very strong, but are more limited than public key cryptographic systems, because the two parties must somehow exchange or agree to a shared key in a manner that does not disclose the key to any third party. To overcome this limitation, in step 324 exemplary embodiments of the present invention encrypt the randomly-generated symmetric key using the public key of the transaction repository server that was originally transmitted with the blank electronic ballot.

Any affirmations and/or state oaths that citizen 102 is required to electronically submit, the identification tag of the appropriate TR server 110, and the ballot type or style are appended to the encrypted voted electronic ballot and encrypted symmetric key to create a voted electronic ballot object. In step 326, the voted electronic ballot object can be digitally signed using the private key of citizen 102 in the manner described previously. Also in step 326, the digitally-signed voted electronic ballot object can be sent to TM server 108. Once the voted electronic ballot object has been transmitted, information associated with the encrypted voted electronic ballot object can be erased from the second computer.

TM server 108 can attach a date-time stamp to the voted electronic ballot. TM server 108 can also perform several checks on the ballot in step 328, including, for example, verifying the digital signature of citizen 102 (using, for example, the public key generated by or for the registered voter) and validating the cryptographic identification of citizen 102 in accordance with, for example, X.509 standards. If the checks are successful in step 330, in step 332 TM server 108 can digitally sign the voted electronic ballot (including the date-time stamp), attach the cryptographic identification created for and issued to TM server 108, and forward the ballot to the TR server 110 indicated by the TR server identification tag contained in the ballot. If not successfully verified in step 330, citizen 102 must make another request to vote in step 304. Once the voted electronic ballot has been transmitted from TM server 108, information associated with the voted electronic ballot can be erased from TM server 108.

Upon receipt of the electronic ballot at the designated TR server 110, in step 334 TR server 110 can use the public keys of TM server 108 and citizen 102 to verify the digital signatures of both TM server 108 and citizen 102. If successfully verified in step 336 of FIG. 3B, in step 338 TR server 110 can provide a confirmation response to TM server 108. The response provided by TR server 110 can cause TM server 108 to provide to the second computer (e.g., citizen workstation 104) similar confirmation response. If not successfully verified in step 336, citizen 102 must make another request to vote in step 304. In an alternate exemplary embodiment, if not successfully verified in step 336, TR server 110 can, for example, send a failure response to TM server 108. The failure response received by TM server 108 can cause TM server 108 to provide a similar failure response to the second computer (e.g., citizen workstation 104). In step 340, the verified voted electronic ballot objects are stored in the computer database residing on TR server 110.

Figure 4:
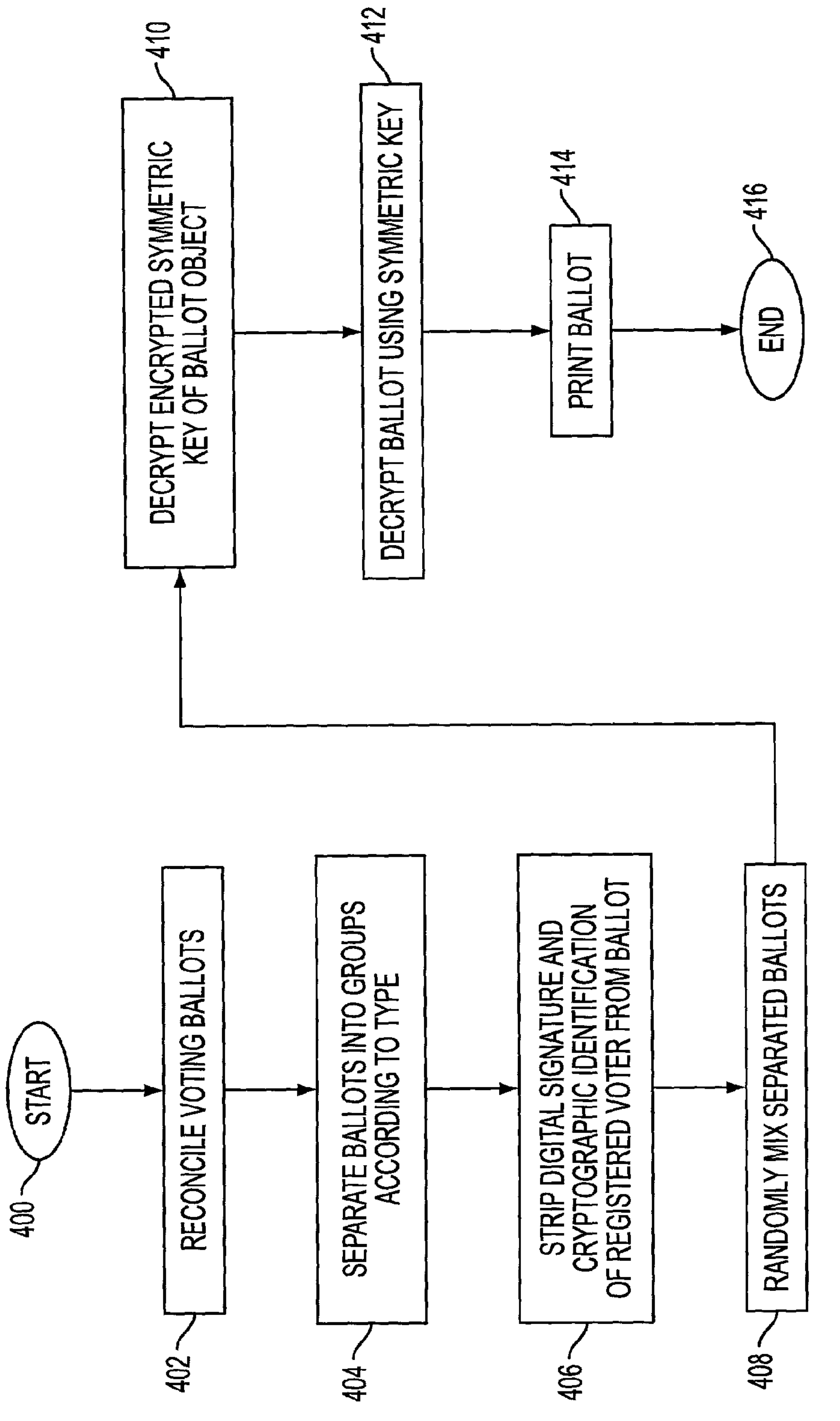
FIG. 4 is a flowchart illustrating the steps carried out for ballot processing in accordance with an exemplary embodiment of the present invention.

Each voted electronic ballot object is processed by TR personnel 114. An exemplary method for ballot processing will now be described with reference to FIG. 4. In step 402, voted electronic ballots are reconciled by an operator of the transaction repository server (e.g., TR personnel 114) to establish the validity of each transmitted voted electronic ballot. The vote of each citizen 102 counts only once, but a citizen 102 may re-submit ballots in an election using the electronic voting system of the present invention. For example, citizen 102 may submit an original ballot, then realize that their ballot was entered or processed incorrectly. According to exemplary embodiments of the present invention, citizen 102 can correct their ballot by re-submitting another voted electronic ballot. Given the multiplicity of ballots that could be submitted for each citizen 102, it is the responsibility of the TR personnel 114 who oversee the election to determine which ballot is to be counted for each citizen 102. In addition, for example, ballots could arrive too late to be counted, or a voter might become deceased or convicted of felonies after a ballot is received, or the citizen's vote might be successfully challenged. The determination of validity, therefore, can be made based on, for example, the registration information of citizen 102, the date-time stamp of the voted electronic ballot, and other factors.

Figure 6A:
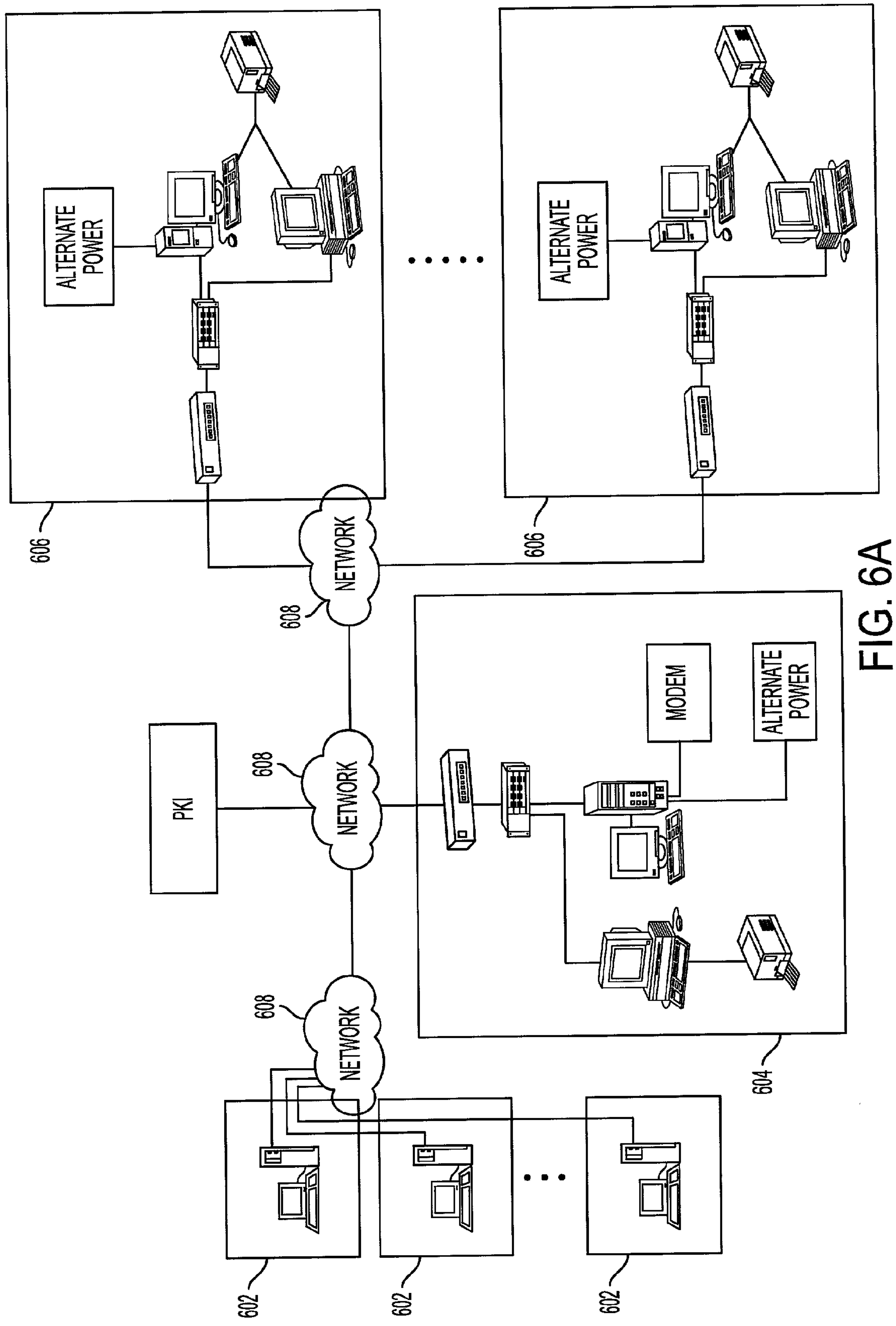
FIG. 6A is a detailed pictorial representation of the network architecture of the three principal computer systems of an exemplary embodiment of the present invention.
Figure 6B:
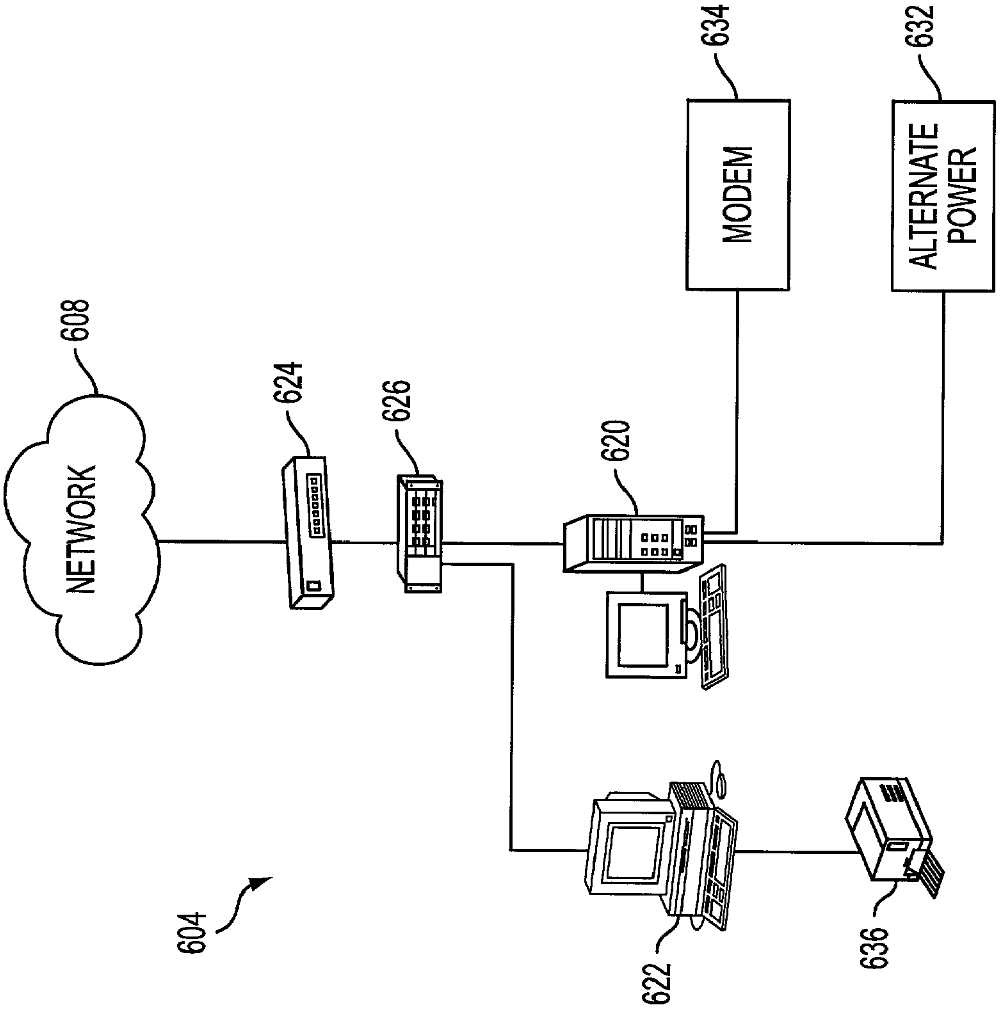
FIG. 6B is a detailed pictorial representation of an exemplary embodiment of a network architecture of a Transaction Mediator (TM) server site.
Figure 6C:
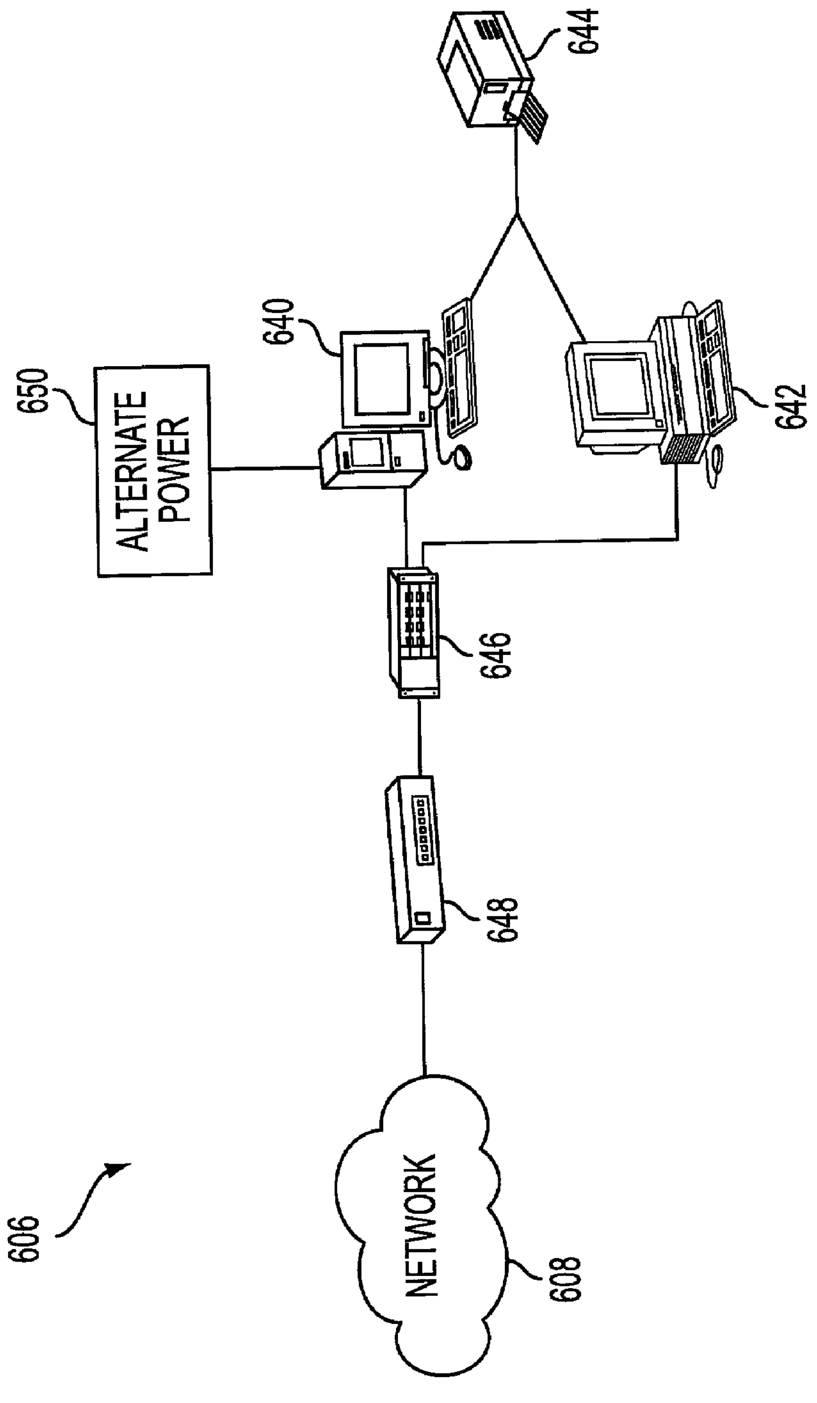
FIG. 6C is a detailed pictorial representation of an exemplary embodiment of a network architecture of a Transaction Repository (TR) server site.

To process a voted electronic ballot, TR personnel 114 can access the computer database residing on TR server 110 through, for example, a TR admin workstation (e.g., TR admin workstation 642 as shown in FIG. 6C). According to exemplary embodiments of the present invention, the TR personnel 114 can view certain details of each voted electronic ballot, such as, for example, the ballot type. When viewing the details, TR server 110 can re-verify the digital signatures of both citizen 102 and TM server 108. Based on their analysis of the ballot or ballots of citizen 102, exemplary embodiments of the present invention allow only one valid voted electronic ballot to exist for each citizen 102 at any one time.

Once the voted electronic ballots are reconciled, in step 404 a plurality of valid encrypted voted electronic ballots are separated into groups based on at least one characteristic, such as, for example, ballot type. Once separated, in step 406, the digital signature and the cryptographic identification of the registered voter are stripped from each group of valid encrypted voted electronic ballots. In step 408, the separated encrypted voted electronic ballots are randomly mixed within each group. Stripping and mixing ensure that citizen 102 cannot be associated with the selections made within their voted electronic ballot, thereby preserving the secrecy of each voted electronic ballot. The stripped voted electronic ballots can be stored in a computer database residing on TR server 110.

Using the stripped voted electronic ballots, each electronic vote can be tallied by TR personnel 114. To tally the votes, each vote can be printed out. To print a voted electronic ballot, in step 410 TR server 110 decrypts the encrypted symmetric key of each separated voted electronic ballot using the private key generated by or for the transaction repository server (e.g., TR server 110). Since the encrypted voted electronic ballot can only be decrypted by the trusted party (e.g., TR personnel 114) that possesses the corresponding private key, ballot objects can reside securely in the computer database. Using the symmetric key, in step 412 TR server 110 decrypts the encrypted voted electronic ballot to recover the voted electronic ballot. Once decrypted, TR server 110 can reassemble the modified voted electronic ballot into a single printable file, such as, for example, an HTML file. In step 414, TR server 110 can print each voted electronic ballot for tallying. Each voted electronic ballot can also be printed with, for example, the ballot type and date of the ballot. Although after a ballot is printed TR server 110 can erase the printable file, the stripped voted electronic ballots can be retained for potential reprint.

According to exemplary embodiments of the present invention, citizen 102 can verify at least one of a voter registration status and an electronic ballot status in the voting system and method of the present invention. Citizen 102 can also verify both the voter registration status and the electronic ballot status. Status can be verified by establishing at least one computer database on a transaction repository server (e.g., TR server 110) that contains information associated with at least one of the voter registration status of a citizen and the electronic ballot status, or by using any conventional technique for verifying voter registration status and electronic voting ballot status of a citizen. The computer database can be established according to the voting registration process described previously, or by any method that can establish, in a computer database, information associated with voter registration status and electronic ballot status.

Figure 5:
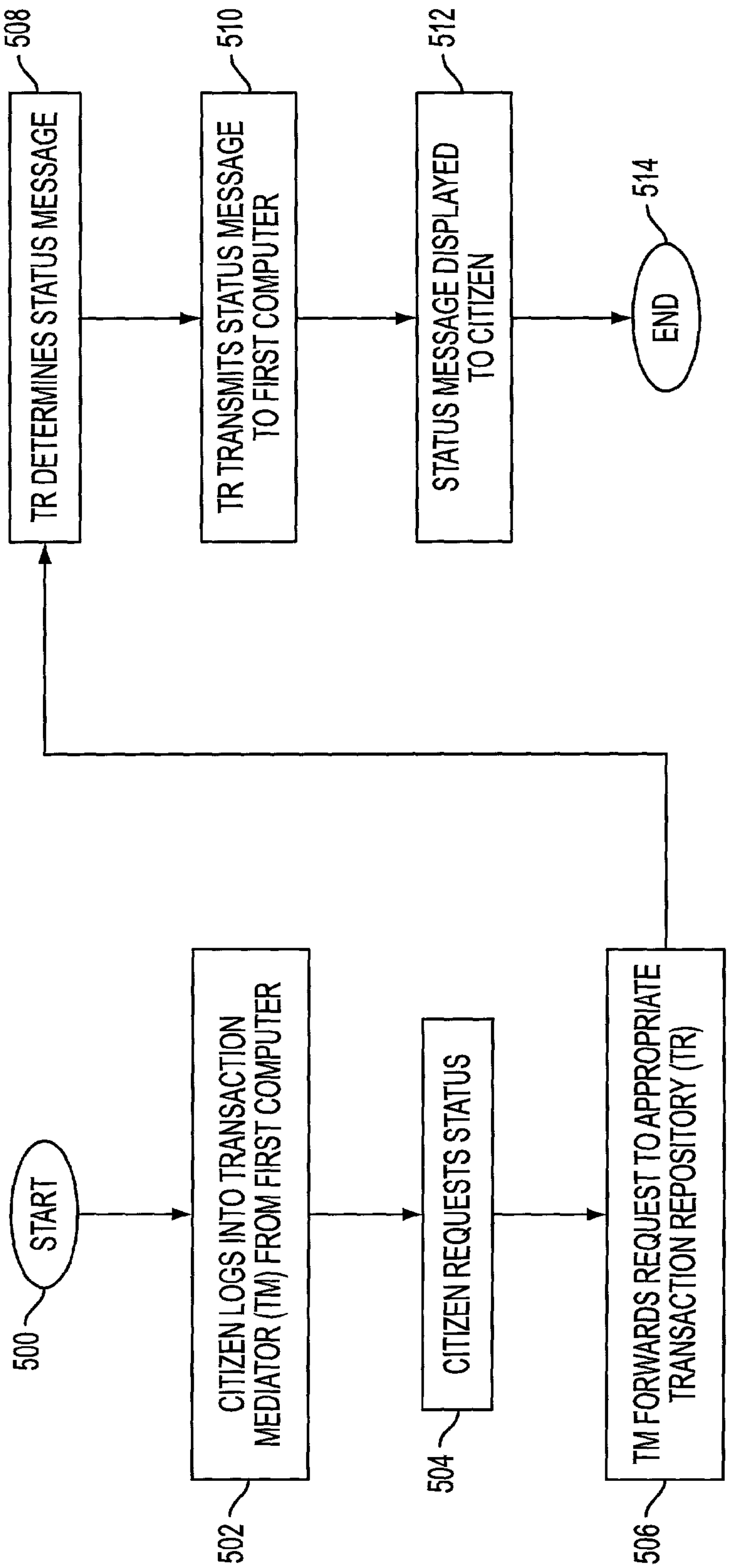
FIG. 5 is a flowchart illustrating the steps carried out for verifying at least one of a voter registration status request and an electronic ballot status request in accordance with an exemplary embodiment of the present invention.

An exemplary method for verifying at least one of a voter registration status and an electronic ballot status request will now be described with reference to FIG. 5. In step 502, citizen 102 logs into TM server 108 in the manner described previously, if not already logged in. When presented with the election service options, in step 504 citizen 102 can request a status at a first computer (e.g., citizen workstation 104) from the transaction repository server (e.g., TR server 110). As part of the status request, citizen 102 can include, for example, the state and county of their residence. In an exemplary embodiment of the present invention, a transaction mediator (e.g., TM server 108) communicates information between the first computer (e.g., citizen workstation 104) and the transaction repository server (e.g., TR server 110). In accordance with an exemplary embodiment of the present invention, in step 506 the status request can be forwarded by TM server 108 to the appropriate TR server 110.

Upon receipt of the status request, in step 508 TR server 110 determines a status message in response to the status request by examining the at least one computer database. The status message can be at least one of the voter registration status and the electronic ballot status from the at least one computer database. Upon determination, in step 510 the status message is transmitted from the transaction repository server (e.g., TR server 110) to the first computer (e.g., citizen workstation 104). In accordance with an exemplary embodiment of the present invention, the status message can be forwarded by TM server 108 to the first computer (e.g., citizen workstation 104). According to an exemplary embodiment of the present invention, the status response message provided by TR server 110 can include information such as, for example: citizen 102 is not registered to vote; the voting registration of citizen 102 is rejected; the voting registration of citizen 102 is still pending; the voting registration of citizen 102 is approved, but it is too early to vote; the voting registration of citizen 102 is approved, but it is too late to vote; the voting registration of citizen 102 is approved, but the ballot is not loaded; the voting registration of citizen 102 is approved, and the ballot is available; the voting registration of citizen 102 is approved, and citizen 102 has already voted; and the voting registration of citizen 102 is approved, but citizen 102 has requested too many ballots.

FIG. 6A is a detailed pictorial representation of the network architecture of the three principal computer systems of an exemplary embodiment of the present invention. The citizen workstations 602 are the interface through which each citizen is able to register and vote. Citizen workstations 602 can be located anywhere—in a home, office, or an established polling place, for example. Exemplary embodiments of the present invention allow citizens to vote at citizen workstations 602 that are located outside of the voting district of the citizens. Each citizen workstation 602 can be, for example, a generic personal computer that should have a network card or modem, for example, installed so that the citizen using the personal computer can access an electronic communications network 608, such as the Internet. Each citizen workstation 602 should be loaded with a web browser, such as, for example, Netscape Communicator. Each citizen workstation 602 should have a floppy drive or smart card reader, for example, to allow each citizen to input their floppy disk or smart card containing their private key and cryptographic identification.

A TM server network 604 includes one or more TM servers. As shown in greater detail in FIG. 6B, TM server network 604 includes at least one TM server 620. In an exemplary embodiment of the present invention, TM server 620 can be, for example, a high performance personal computer or computer workstation that is loaded with software including, for example, Windows NT 4.0 Server, Microsoft Internet Information Service 4.0, Cold Fusion Application Server 4.5, and Microsoft SQL Server 7.0, or any other operating system software and software that supports networking, network accessing, and database management, for example. TM admin workstation 222 can be, for example, a low-end personal computer. TM admin workstation 622 can be used to monitor TM server 620 and access information residing on TM server 620, such as, for example, reports and event logs. In an exemplary embodiment of the present invention, TM admin workstation 622 can be loaded with Windows NT 4.0 Workstation, for example, or any other operating system software, and a web browser, such as, for example, Netscape Communicator, and can be connected to TM server 620 over a local area network connection. TM server network 604 can also include a printer 636, such as a laser printer, for example, connected to TM admin workstation 622 for report printing.

In addition, TM server network 604 can include a TM router 624 to connect TM server network 204 to electronic communications network 608. TM server network 604 can also include a TM hub 626 to allow networking of each of the components of TM server network 604. For added support, TM uninterruptible power supply 632 can be used, for example, for server alarms and graceful system shutdown in the event of power failure. TM modem 634 can be used, for example, to dial pagers in the event of TM alarms.

As shown in greater detail in FIG. 6C, TR server network 606 includes a plurality of TR servers 640. In an exemplary embodiment of the present invention, TR server 640 can be, for example, a medium performance personal computer or computer workstation running software including, for example, Windows NT 4.0 Server, Microsoft Internet Information Service 4.0, Cold Fusion Application Server 4.5, and Microsoft SQL Server 7.0, or any other operating system software and software that supports networking, network accessing, and database management, for example. In an exemplary embodiment of the present invention, TR admin workstation 642 can be, for example, a low-end personal computer running software including Windows NT 4.0 Workstation, for example, or any other operating system software, and a web browser, such as, for example, Netscape Communicator. TR admin workstation 642 can be connected to TR server 640 through a local area network. TR admin workstation 642 can be used by TR personnel 114 to monitor TR server 640 remotely.

TR server network 606 can also include a printer 644, such as a laser printer, for example, connected to both TR server 640 and TR admin workstation 642 for printing voted electronic ballots and registration forms, respectively. In addition, TR server network 606 can include a TR router 648 to connect TR server network 606 to electronic communications network 608 and TR hub 646 to allow networking of each of the components of TR server network 606. For added support, TR uninterruptible power supply 650 can be used, for example, for server alarms and graceful system shutdown in the event of power failure.

It will be appreciated by those skilled in the art that the present invention can be embodied in other specific forms without departing from the spirit or essential character thereof. The presently disclosed embodiments are therefore considered in all respects to be illustrative and not restrictive. The scope of the invention is indicated by the appended claims rather than the foregoing description and all changes that come within the meaning and range of equivalents thereof are indicated to be embraced therein.

What is claimed is:

1. A method for completing and submitting an electronic voter registration form and an electronic ballot over a network, comprising the steps of:

transmitting a blank electronic registration form, upon request at a first computer, via a transaction mediator, to the first computer;

transmitting registration information from the first computer, via the transaction mediator, to a computer database that resides on a transaction repository server, all of which are networked together, to establish a registered voter;

transmitting a blank electronic ballot, upon request by the registered voter at a second computer, from the computer database that resides on the transaction repository server, via the transaction mediator, to the second computer; and transmitting a voted electronic ballot from the second computer, via the transaction mediator, to the computer database that resides on the transaction repository server.

2. The method of claim 1, comprising:

establishing at least one computer database on the transaction repository server that contains information associated with at least one of a voter registration status of a citizen and a electronic ballot status;

requesting a status at the first computer from the transaction repository server;

determining a status message in response to the step of requesting by examining the at least one computer database; and transmitting the status message from the transaction repository server to the first computer.

3. The method of claim 2, wherein the voter registration status of the citizen and the electronic ballot status are verified.

4. The method of claim 1, wherein the network includes:

an encrypted communication channel between at least one of the first and second computer and the transaction mediator, and an encrypted communication channel between the transaction mediator and the transaction repository server.

5. The method of claim 1, wherein the registration information includes at least one descriptive element associated with a citizen.

6. The method of claim 1, wherein the step of transmitting registration information comprises:

entering the registration information; and digitally signing the registration information using a private key of a public-private key pair, wherein the public-private key pair is generated using an asymmetric cryptographic function, wherein a public key of the public-private key pair is associated with a cryptographic identification of a citizen, and wherein the public-private key pair and the cryptographic identification are created prior to transmitting the registration information.

7. The method of claim 6, wherein the step of transmitting registration information comprises:

erasing from the first computer information associated with the registration information once the registration information has been transmitted.

8. The method of claim 6, wherein the step of transmitting registration information comprises:

verifying the digital signature using the public key of the public-private key pair.

9. The method of claim 6, wherein the public-private key pair and the cryptographic identification can be used by the citizen with respect to a plurality of electronic transactions.

10. The method of claim 1, wherein the step of transmitting registration information comprises:

approving or denying a voting registration request at the computer database based on the registration information of a citizen.

11. The method of claim 1, wherein the second computer is the first computer.

12. The method of claim 1, wherein the step of transmitting a blank electronic ballot comprises:

digitally signing the blank electronic ballot using a private key of a public-private key pair, wherein the public-private key pair is generated using an asymmetric cryptographic function, wherein a public key of the public-private key pair is associated with a cryptographic identification of an operator of the transaction repository server, and wherein the public-private key pair and the cryptographic identification are created prior to transmitting the blank electronic ballot; and transmitting a public key of a public-private key pair of the transaction repository server.

13. The method of claim 1, wherein the step of transmitting the voted electronic ballot comprises:

executing the blank electronic ballot;

encrypting the voted electronic ballot using a symmetric cryptographic function and a symmetric key that is randomly generated by the second computer;

encrypting the symmetric key using a public key of a public-private key pair of the transaction repository server; and digitally signing the encrypted voted electronic ballot and the encrypted symmetric key using a private key of a public-private key pair, wherein the public-private key pair is generated using an asymmetric cryptographic function, wherein a public key of the public-private key pair is associated with a cryptographic identification of the registered voter, and wherein the public-private key pair and the cryptographic identification are created prior to transmitting the voted electronic ballot.

14. The method of claim 13, comprising:

erasing from the second computer information associated with the encrypted voted electronic ballot once the voted electronic ballot has been transmitted.

15. The method of claim 13, comprising:

verifying the digital signature of the encrypted voted electronic ballot and the encrypted symmetric key using the public key of the public-private key pair of the registered voter.

16. The method of claim 13, comprising:

reconciling transmitted voted electronic ballots by an operator of the transaction repository server to establish the validity of each transmitted voted electronic ballot.

17. The method of claim 16, comprising:

separating a plurality of valid encrypted voted electronic ballots into groups based on at least one characteristic;

stripping the digital signature and the cryptographic identification of the registered voter from each group of valid encrypted voted electronic ballots; and randomly mixing within each group the separated encrypted voted electronic ballots.

18. The method of claim 17, wherein the at least one characteristic is a type of voted electronic ballot.

19. The method of claim 17, comprising:

decrypting the encrypted symmetric key of each separated voted electronic ballot using a private key of the public-private key pair of the transaction repository server;

decrypting the encrypted voted electronic ballot using the symmetric key to recover the voted electronic ballot; and printing the voted electronic ballot.

20. A method for verifying at least one of a voter registration status and an electronic ballot status in a voting system, comprising the steps of:

establishing at least one computer database on a transaction repository server that contains information associated with at least one of the voter registration status of a citizen and the electronic ballot status;

receiving, from a first computer connected to a computer network, a citizen's request regarding status of at least one of the citizen's voter registration and the citizen's electronic ballot status;

determining a status message in response to the step of receiving by examining the at least one computer database; and transmitting the status message from the transaction repository server to the first computer over the computer network.

21. The method of claim 20, wherein a transaction mediator communicates information between the first computer and the transaction repository server.

22. The method of claim 20, wherein the voter registration status of the citizen and the electronic ballot status are verified.

23. A method for completing and submitting an electronic voter registration form and an electronic ballot transmitted over a network, comprising the steps of:

transmitting registration information from a first computer to a computer database that resides on a transaction repository server, all of which are networked together, to establish a registered voter; and transmitting a voted electronic ballot of the registered voter from a second computer to the computer database that resides on the transaction repository server.

24. The method of claim 23, wherein the second computer is the first computer.

25. The method of claim 23, comprising:

transmitting a blank electronic registration form, upon request at the first computer, to the first computer.

26. The method of claim 25, comprising:

transmitting a blank electronic ballot, upon request by the registered voter at the second computer, from the computer database that resides on the transaction repository server to the second computer.

27. The method of claim 23, wherein the step of transmitting registration information comprises:

entering the registration information; and digitally signing the registration information using a private key of a public-private key pair, wherein the public-private key pair is generated using an asymmetric cryptographic function, wherein a public key of the public-private key pair is associated with a cryptographic identification of a citizen, and wherein the public-private key pair and the cryptographic identification are created prior to transmitting the registration information.

28. The method of claim 27, wherein the public-private key pair and the cryptographic identification can be used by the citizen with respect to a plurality of electronic transactions.

29. The method of claim 26, wherein the step of transmitting a blank electronic ballot comprises:

digitally signing the blank electronic ballot using a private key of a public-private key pair, wherein the public-private key pair is generated using an asymmetric cryptographic function, wherein a public key of the public-private key pair is associated with a cryptographic identification of an operator of the transaction repository server, and wherein the public-private key pair and the cryptographic identification are created prior to transmitting the blank electronic ballot; and transmitting a public key of a public-private key pair of the transaction repository server.

30. The method of claim 23, wherein the step of transmitting the voted electronic ballot comprises:

executing the blank electronic ballot;

encrypting the voted electronic ballot using a symmetric cryptographic function and a symmetric key that is randomly generated by the second computer;

encrypting the symmetric key using a public key of a public-private key pair of the transaction repository server; and digitally signing the encrypted voted electronic ballot and the encrypted symmetric key using a private key of a public-private key pair, wherein the public-private key pair is generated using an asymmetric cryptographic function, wherein a public key of the public-private key pair is associated with a cryptographic identification of the registered voter, and wherein the public-private key pair and the cryptographic identification are created prior to transmitting the voted electronic ballot.

31. The method of claim 30, comprising:

decrypting the encrypted symmetric key using a private key of the public-private key pair of the transaction repository server;

decrypting the encrypted voted electronic ballot using the symmetric key to recover the voted electronic ballot; and printing the voted electronic ballot.

32. A method for completing and submitting an electronic registration form and an electronic ballot over a network, comprising the steps of:

transmitting a blank electronic registration form, upon request at a first computer, to the first computer; and transmitting registration information from the first computer to a computer database that resides on a transaction repository server, all of which are networked together, to establish a registered voter, so that a voted electronic ballot can be transmitted from a second computer.

33. The method of claim 32, comprising:

transmitting a blank electronic ballot, upon request by the registered voter at a the second computer, from the computer database that resides on the transaction repository server to the second computer.

34. The method of claim 33, wherein the second computer is the first computer.

35. The method of claim 33, comprising:

transmitting a voted electronic ballot from the second computer to the computer database that resides on the transaction repository server.

36. The method of claim 32, wherein the step of transmitting registration information comprises:

entering the registration information; and digitally signing the registration information using a private key of a public-private key pair, wherein the public-private key pair is generated using an asymmetric cryptographic function, wherein a public key of the public-private key pair is associated with a cryptographic identification of a citizen, and wherein the public-private key pair and the cryptographic identification are created prior to transmitting the registration information.

37. The method of claim 36, wherein the public-private key pair and the cryptographic identification can be used by the citizen with respect to a plurality of electronic transactions.

38. The method of claim 33, the step of transmitting a blank electronic ballot comprises:

digitally signing the blank electronic ballot using a private key of a public-private key pair, wherein the public-private key pair is generated using an asymmetric cryptographic function, wherein a public key of the public-private key pair is associated with a cryptographic identification of an operator of the transaction repository server, and wherein the public-private key pair and the cryptographic identification are created prior to transmitting the blank electronic ballot; and transmitting a public key of a public-private key pair of the transaction repository server.

39. The method of claim 35, wherein the step of transmitting the voted electronic ballot comprises:

executing the blank electronic ballot;

encrypting the voted electronic ballot using a symmetric cryptographic function and a symmetric key that is randomly generated by the second computer;

encrypting the symmetric key using a public key of a public-private key pair of the transaction repository server; and digitally signing the encrypted voted electronic ballot and the encrypted symmetric key using a private key of a public-private key pair, wherein the public-private key pair is generated using an asymmetric cryptographic function, wherein a public key of the public-private key pair is associated with a cryptographic identification of the registered voter, and wherein the public-private key pair and the cryptographic identification are created prior to transmitting the voted electronic ballot.

40. The method of claim 39, comprising:

decrypting the encrypted symmetric key using a private key of the public-private key pair of the transaction repository server;

decrypting the encrypted voted electronic ballot using the symmetric key to recover the voted electronic ballot; and printing the voted electronic ballot.

41. A system for completing and submitting an electronic voter registration form and an electronic ballot over a network, comprising:

a transaction repository server for transmitting a blank electronic ballot to a first computer;

a computer database, accessible by the transaction repository server, for storing the blank electronic ballot; and a transaction mediator for communicating information between the transaction repository server and the first computer, the transaction mediator being operative to transmit registration information from the first computer to the computer database to establish a registered voter, so that a voted electronic ballot can be transmitted from a second computer.

42. The system of claim 41, wherein the transaction mediator is operative to transmit the voted electronic ballot from the first computer to the computer database.

43. The system of claim 42, wherein the first computer comprises multiple computers.

44. The system of claim 41, comprising:

an encrypted communication channel between the first computer and the transaction mediator, and an encrypted communication channel between the transaction mediator and the transaction repository server.

45. The system of claim 41, wherein the registration information includes at least one descriptive element associated with the citizen.

46. A system for verifying at least one of a voter registration status and an electronic ballot status in a voting system, comprising:

a first computer connected to a computer network by which a citizen can request at least one of the citizen's voter registration status and the citizen's electronic ballot status from a transaction repository server; and at least one computer database, accessible by the transaction repository server, for containing information associated with at least one of the voter registration status of a citizen and the electronic ballot status;

the transaction repository server being operative for determining a status message in response to the status request by examining the at least one computer database, and for transmitting the status message to the first computer.

47. The system of claim 46, wherein the voter registration status of the citizen and the electronic ballot status are verified.

* * * * *